United States Patent
Hirai et al.

(10) Patent No.: US 10,041,509 B2
(45) Date of Patent: Aug. 7, 2018

(54) HYDRAULIC DEVICE

(71) Applicant: AISIN AW CO., LTD., Anjo-shi, Aichi-ken (JP)

(72) Inventors: Nobuyuki Hirai, Anjo (JP); Masamichi Yamaguchi, Anjo (JP); Yoshimitsu Hyodo, Anjo (JP); Kenichi Tsuchida, Anjo (JP); Naoyuki Fukaya, Anjo (JP)

(73) Assignee: AISIN AW CO., LTD., Anjo (JP)

( * ) Notice: Subject to any disclaimer, the term of this patent is extended or adjusted under 35 U.S.C. 154(b) by 350 days.

(21) Appl. No.: 15/021,150

(22) PCT Filed: Sep. 30, 2014

(86) PCT No.: PCT/JP2014/076201
§ 371 (c)(1),
(2) Date: Mar. 10, 2016

(87) PCT Pub. No.: WO2015/046605
PCT Pub. Date: Apr. 2, 2015

(65) Prior Publication Data
US 2016/0222991 A1 Aug. 4, 2016

(30) Foreign Application Priority Data

Sep. 30, 2013 (JP) ................. 2013-205572

(51) Int. Cl.
*F15B 13/06* (2006.01)
*F15B 11/17* (2006.01)
*F16H 61/00* (2006.01)

(52) U.S. Cl.
CPC ............. *F15B 13/06* (2013.01); *F15B 11/17* (2013.01); *F16H 61/0021* (2013.01);
(Continued)

(58) Field of Classification Search
CPC ............................. F15B 13/06; F15B 11/17; F15B 2211/20515; F15B 2211/20523;
(Continued)

(56) References Cited

U.S. PATENT DOCUMENTS

| 2010/0193313 A1 | 8/2010 | Shimizu et al. |
| 2010/0203989 A1* | 8/2010 | Shirasaka ........... F16H 61/0031 474/28 |

(Continued)

FOREIGN PATENT DOCUMENTS

| JP | 2004-036667 A | 2/2004 |
| JP | 2009-144874 A | 7/2009 |

(Continued)

OTHER PUBLICATIONS

Jan. 13, 2015 Search Report issued in International Patent Application No. PCT/JP2014/076201.

*Primary Examiner* — Jacob S. Scott
*Assistant Examiner* — Tinh Dang
(74) *Attorney, Agent, or Firm* — Oliff PLC

(57) ABSTRACT

A hydraulic device wherein an orifice is provided upstream of the discharge valve in an oil passage from the electric pump, a drain oil passage from the second hydraulic servo communicates between the orifice and the discharge valve in the oil passage from the electric pump, and an oil pressure in the oil passage upstream of the orifice is maintained at a predetermined pressure higher than the set pressure.

10 Claims, 1 Drawing Sheet

(52) U.S. Cl.
CPC .............................. *F16H 61/0031* (2013.01); *F15B 2211/20515* (2013.01); *F15B 2211/20523* (2013.01); *F15B 2211/20576* (2013.01)

(58) Field of Classification Search
CPC ....... F15B 2211/20576; F16H 61/0031; F16H 61/0021
See application file for complete search history.

(56) References Cited

U.S. PATENT DOCUMENTS

| | | | |
|---|---|---|---|
| 2012/0137670 A1* | 6/2012 | Shimizu | F16H 61/0021 60/430 |
| 2012/0144818 A1 | 6/2012 | Shimizu et al. | |
| 2012/0234645 A1* | 9/2012 | Shimizu | F16H 61/0206 192/85.63 |

FOREIGN PATENT DOCUMENTS

| | | |
|---|---|---|
| JP | 2010-175039 A | 8/2010 |
| JP | 2012-122560 A | 6/2012 |
| JP | 2013-174259 A | 9/2013 |

* cited by examiner

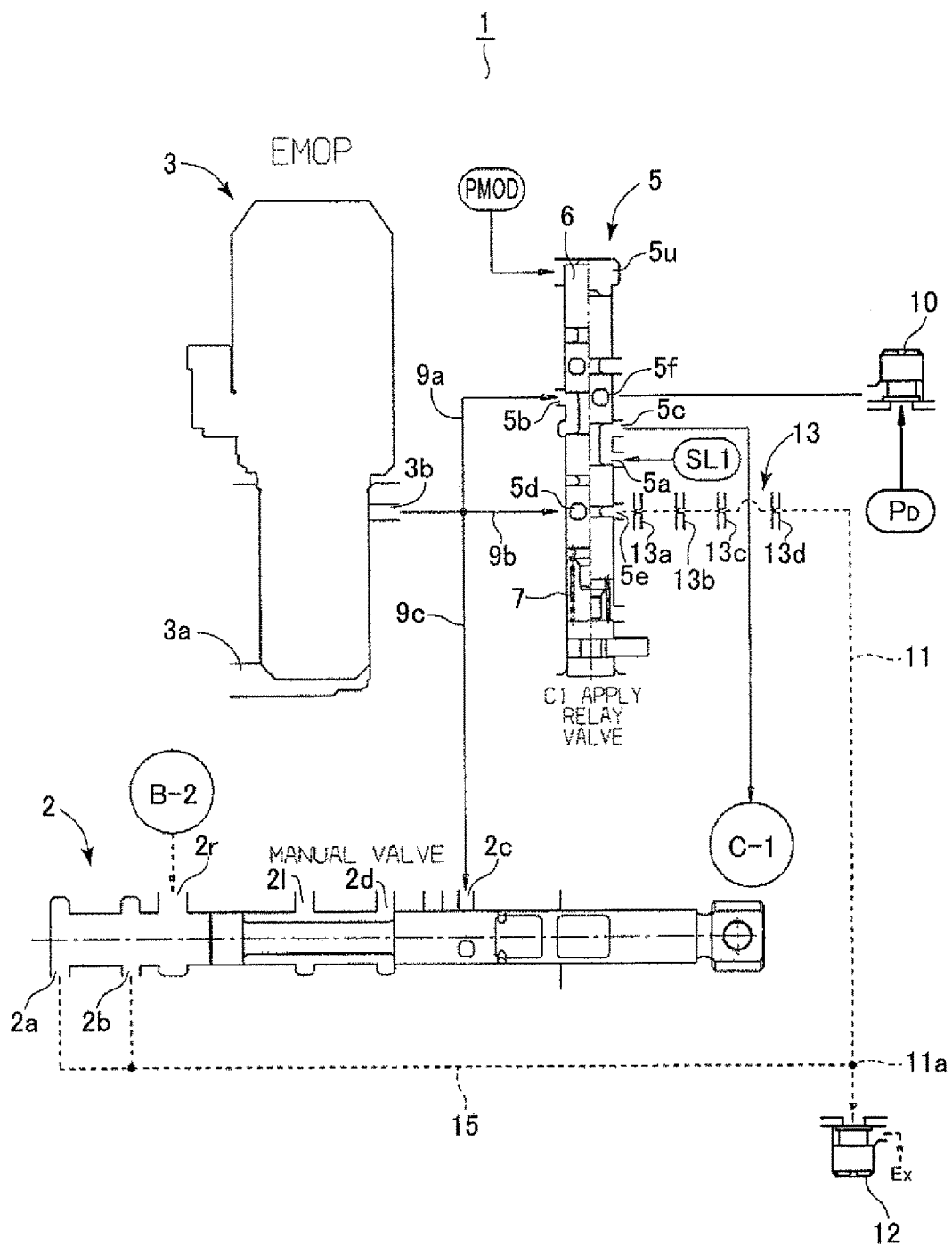

HYDRAULIC DEVICE

BACKGROUND

The present disclosure relates to hydraulic devices having a discharge valve, and more particularly to hydraulic devices for vehicles that are moved by an engine.

Conventionally, a hydraulic device is proposed which is mounted on an automobile having an idling stop function and which includes a mechanical pump that is operated by power of an engine, an electromagnetic pump that is driven by electric power, a linear solenoid valve SL1 that regulates a discharge pressure from the mechanical pump, and a switching valve that is operated by an oil pressure (modulator pressure) from the mechanical pump to switch an supply pressure to a hydraulic servo for a C1 clutch that is to be engaged when the automobile is started to either an output pressure (regulated pressure) from the linear solenoid valve or a discharge pressure of the electromagnetic pump. The switching valve includes a drain port that directs an oil pressure from the electromagnetic pump to a check valve (discharge valve), in addition to a first input port that communicates with the linear solenoid valve, a second input port that communicates with the electromagnetic pump, and an output port that communicates with the hydraulic servo for the C1 clutch (see Japanese Patent Application Publication No. 2012-122560).

When the engine is rotated in a D range, the modulator pressure based on the mechanical pump is applied to a spool of the switching valve. The switching valve is thus switched to a first state where the first input port communicates with the output port, and the regulated pressure from the linear solenoid valve based on the mechanical pump is supplied to the hydraulic servo for the C1 clutch. In an idling stop state, the mechanical pump is stopped, and no modulator pressure is generated. The switching valve is thus switched to a second state where the second input port communicates with the output port. A predetermined oil pressure (stroke end pressure) from the electromagnetic pump that is driven in the idling stop state is supplied to the hydraulic servo for the C1 clutch, and this hydraulic servo is maintained in the state immediately before the C1 clutch is engaged, preparing for the automobile to be started again.

The check valve (discharge valve) having an increased opening pressure communicates with the drain port of the switching valve. In the first state, the drain port communicates with the electromagnetic pump. The switching valve causes leakage of an oil pressure into the input ports from between a valve body and a spool.

In the first state where the oil pressure based on the mechanical pump is supplied to the hydraulic servo for the C1 clutch, the oil pressure due to the leakage is applied from the first input port to an oil pressure supply oil passage of the electromagnetic pump. Since this oil passage communicates with the check valve via the drain port, the oil pressure in this oil passage is maintained at a set pressure of the check valve with the increased opening pressure, and is prevented from increasing to an excessive level.

A motor-driven pump that is driven by an electric motor may be used instead of the electromagnetic pump. Electrically driven pumps including the electromagnetic pump and the motor-driven pump are herein defined as electric pumps.

SUMMARY

For the above hydraulic device, the check valve with the increased opening pressure needs to be specially designed and placed at the drain port of the switching valve. Accordingly, the check valve (discharge valve) for the electric pump is a special check valve and a check valve with common design cannot be used as the check valve. This causes an increase in cost, and also requires a space for the check valve to be mounted specially.

An exemplary aspect of the present disclosure provides a hydraulic device in which an orifice is provided upstream of a discharge valve (check valve) and in which a discharge valve with a common design can be used as the discharge valve and the discharge valve can also be used in other oil passage, thereby solving the above problem.

According to an exemplary aspect of the present disclosure, a hydraulic device includes a mechanical pump that is driven by power from an engine, an electric pump that is driven by electric power, a first hydraulic servo for a first friction engagement element that is engaged when a vehicle is started, a second hydraulic servo for a second friction engagement element which is provided separately from the first hydraulic servo, a pressure regulation valve that regulates an oil pressure based on the mechanical pump, a switching valve that switches between a first state where a first input port communicating with the pressure regulation valve communicates with an output port communicating with the first hydraulic servo by the oil pressure based on the mechanical pump, and a second state where the mechanical pump is stopped and a second input port communicating with the electric pump communicates with the output port accordingly, and a discharge valve that communicates with an oil passage from the electric pump and discharges an oil pressure equal to or higher than a set pressure when the switching valve is in the first state, wherein an orifice is provided upstream of the discharge valve in an oil passage from the electric pump, a drain oil passage from the second hydraulic servo communicates between the orifice and the discharge valve in the oil passage from the electric pump, and an oil pressure in the oil passage upstream of the orifice is maintained at a predetermined pressure higher than the set pressure.

According to this hydraulic device, in the first state where the oil pressure based on the mechanical pump is supplied to the first hydraulic servo for the first friction engagement element, the oil passage from the electromagnetic pump including the second input port is maintained at the predetermined pressure higher than the set pressure of the discharge valve as the orifice is provided in the oil passage. The oil pressure of this hydraulic servo therefore quickly and smoothly rises toward an engagement pressure when the vehicle is started again after idling stop. The vehicle can thus be quickly started without causing discomfort. Moreover, since the orifice is provided, a discharge valve with common design having a low set opening pressure can be used as the discharge valve. Reduction in cost can thus be achieved by using parts with common design (modularized parts).

Since a discharge valve with common design can be used as the discharge valve, the discharge valve can also be used in an oil passage of other hydraulic servo etc. In this case, the discharge valve communicates with other oil passage to which an oil pressure is drained in a D range, and does not interfere with the function of the discharge valve in the D range. Entry of air into this other oil passage, etc. can thus be prevented.

BRIEF DESCRIPTION OF THE DRAWINGS

FIG. 1 is a diagram showing a hydraulic device according to an embodiment.

DETAILED DESCRIPTION OF EMBODIMENTS

FIG. 1 is a schematic diagram showing a main part of a hydraulic device for an automatic transmission which is mounted on an automobile. The automatic transmission may be an automatic transmission shown in FIGS. 1 and 2 of Japanese Patent Application Publication No. 2012-122560 or may be an automatic transmission for FR vehicles. This automatic transmission includes many friction engagement elements comprised of clutches and brakes, in addition to a C1 clutch (first friction engagement element) that is engaged when the automobile is started in a D range and a reverse brake B2 (second friction engagement element) to which an oil pressure is supplied in a reverse (R) range. These friction engagement elements are engaged and disengaged to change a power transmission path to shift power from an engine (internal combustion engine) (e.g., six forward speeds and one reverse speed), thereby transmitting the resultant power to a driving wheel.

A hydraulic device 1 has a linear solenoid valve SL1 as a pressure regulation valve in addition to a manual valve 2, an electromagnetic pump 3, and a switching valve (C1 relay valve) 5. The manual valve 2 is switched to a parking (P) range, a reverse (R) range, a neutral (N) range, and a drive (D) range by a driver's operation to supply a line pressure (source pressure) to an R range line pressure port (reverse range port) 2r or a D range line pressure port 2d. FIG. 1 shows a state in the D range, where the R range line pressure port 2r communicates with drain ports 2a, 2b, the D range line pressure port 2d communicates with a line pressure port (source pressure port) 21, and a communication port 2c is closed. In the R range, the line pressure is supplied to the R range line pressure port 2r that communicates with a hydraulic servo (second hydraulic servo) B-2 for the reverse brake, and the port 2r and the drain ports 2a, 2b are closed. In the N-range, the R range line pressure port 2r communicates with the drain ports 2a, 2b, the D range line pressure port 2d is in a draining state, and the communication port 2c is in a draining state.

The hydraulic device 1 includes a mechanical pump (not shown) that is driven by power of the engine (internal combustion engine), and a discharge pressure of the mechanical pump is regulated to a line pressure, and this line pressure is supplied to the manual valve 2 and is also supplied to the linear solenoid valve SL1. The linear solenoid valve SL1 is controlled by an electrical signal according to target torque etc. calculated by a control unit, and regulates the received line pressure to a predetermined oil pressure to output the predetermined oil pressure.

The electromagnetic pump 3 forming an electric pump has a solenoid that generates an electromagnetic force by electric power, and a piston that is reciprocated by the solenoid, as shown in, e.g., FIG. 5 of Japanese Patent Application Publication No. 2012-122560. According to the reciprocating motion of the piston, the electromagnetic pump 3 sucks oil in an oil reservoir from a suction port 3a and discharges the oil from a discharge port 3b.

The switching valve 5 has a spool 6 slidably fitted in a valve body. A control oil chamber 5u is located on one (upper) end of the spool, and a spring 7 is disposed in a compressed state on the other (lower) end of the spool. A modulator pressure PMOD obtained by reducing a line pressure by a predetermined proportion by the modulator valve, is supplied to the control oil chamber 5u. Accordingly, in the state where the engine is driven and the mechanical pump is operated, the modulator pressure PMOD based on the mechanical pump is supplied to the control oil chamber 5u, and the switching valve 5 is switched to a first state where the spool 6 is in the right half position in the FIGURE. In the state where the engine is stopped by idling stop, no modulator pressure is generated, and the switching valve 5 is switched to a second state where the spool 6 is in the left half position in the FIGURE by the spring 7.

The switching valve 5 further has a first input port 5a to which a regulated pressure from the linear solenoid valve SL1 based on the mechanical pump is supplied, a second input port 5b that communicates with the discharge port 3b of the electromagnetic pump 3 via an oil passage 9a, and an output port 5c that communicates with a hydraulic servo (first hydraulic servo) C-1 for the C1 clutch that is in an engaged state when the vehicle is started in the D range (first to fourth speeds). The switching valve 5 further has a communication port 5d that communicates with the discharge port 3b of the electromagnetic pump 3 via an oil passage 9b, a drain port 5e, and a third input port 5f to which an oil pressure based on a D range line pressure $P_D$ is supplied in case of a failure. The discharge port 3b of the electromagnetic pump 3 communicates with the communication port 2c of the manual valve 2 via an oil passage 9c.

The ports 5f, 5d shown in a round rectangular shape in FIG. 1 are located so as to have a phase difference of 90 degrees from the ports 5b, 5e located on the same circumference. The D range line pressure $P_D$ is supplied to the third input port 5f via a check valve 10.

A check valve 12 forming a discharge valve is placed for the drain port 5e via an oil passage 11. The check valve 12 has a plug biased by a spring. When the oil pressure in the oil passage 11 is equal to or lower than a set pressure set by the spring, the oil pressure in the oil passage 11 is retained, and an excess pressure that exceeds the set pressure, is discharged. Orifices (orifice group) 13 as a plurality of orifices 13a, 13b, 13c, 13d arranged in series to communicate with each other are provided in the oil passage 11. The orifices 13a to 13d are orifices with common design having a small hole with a predetermined diameter. Even through a pressure drop that is caused by a single orifice is small, a considerably large pressure drop can be achieved by arranging the orifices in multiple stages. Accordingly, even when a check valve with common design (modularized check valve) having a low set pressure is used as the check valve 12, the oil pressure in the drain port 5e located upstream of the orifice group can be a predetermined pressure significantly higher than the set pressure of the check valve 12.

An oil passage 15 branches off (11a) from the oil passage 11 between the orifice group 13 and the check valve 12 so as to communicate between the orifice group 13 and the check valve 12. The oil passage 15 communicates with the drain ports 2a, 2b of the manual valve 2. The check valve 12 therefore serves as both a check valve to be used at the time the vehicle is started in the D range and a check valve for the hydraulic servo B-2 for the reverse brake.

The hydraulic device 1 is configured as described above. Accordingly, in the state where the engine is rotated and the mechanical pump is driven, the modulator pressure PMOD based on the line pressure is supplied to the control oil chamber 5u and the switching valve 5 is in the first state (the right half position). In this state, the line pressure based on the mechanical pump is regulated as appropriate by the linear solenoid valve (pressure regulation valve) SL1, and the regulated pressure is directed to the first input port 5a and is supplied to the hydraulic servo C-1 for the C1 clutch via the output port 5c. The C1 clutch is therefore engaged and the vehicle is started.

When the switching valve 5 is in the first state (the right half position), both the second input port 5b and the third input port 5f are closed. However, these input ports 5b, 5f are located close to each other on the same circumference, and the oil pressure based on the D range line pressure $P_D$ in the third input port 5f leaks into the second input port 5b, so that a relatively high oil pressure is applied to the input port 5b. In this state, the communication port 5d and the drain port 5e of the switching valve 5 communicate with each other, and the communication port 2c of the manual valve 2 is closed. Accordingly, the oil passages 9a, 9c, 9b and the second input port 5b which are located on the discharge side of the electromagnetic pump 3 communicate with the oil passage 11 via the communication port 5d and the drain port 5e, and the oil passage 11 communicates with the check valve 12 via the plurality of orifices 13. The oil passages 9a, 9c, 9b and the second input port 5b are therefore maintained at the predetermined pressure significantly higher than the set pressure of the check valve 12.

When the vehicle is stopped at a traffic light etc., the engine is stopped by an engine stop function. The mechanical pump is therefore stopped, and the modulator pressure PMOD and the regulated pressure from the linear solenoid valve SL1 do not rise as there is no source pressure. The switching valve 5 is thus switched to the second state where the spool 6 is in the left half position by the spring 7. In this state, the electromagnetic pump 3 is driven by a signal from the control unit. The electromagnetic pump 3 thus sucks oil from the suction port 3a and discharges the oil from the discharge port 3b, and the discharge pressure is supplied to the hydraulic servo C-1 for the C1 clutch via the oil passage 9a, the second input port 5b, and the output port 5c. The hydraulic servo C-1 is therefore maintained at the oil pressure immediately before the C1 clutch is engaged (stroke end pressure), preparing for the vehicle to be started when the engine is started again.

In this state, the communication port 5d and the drain port 5e are closed, and the discharge pressure of the electromagnetic pump 3 does not leak through the check valve 12.

When the engine is started from the idling stop state to start the vehicle, the mechanical pump is driven accordingly. The modulator pressure PMOD therefore rises and the switching valve 5 is switched to the first state (the right half position). The oil pressure from the linear solenoid valve SL1 is thus supplied to the hydraulic servo C-1 for the C1 clutch via the first input port 5a and the output port 5c, and the vehicle is started smoothly and quickly. At this time, the electromagnetic pump 3 is stopped. However, since the communication port 5d communicates with the drain port 5e, the residual pressure in the oil passages 9a, 9b is discharged from the check valve 12 through the orifice group 13 and the oil passage 11. Even if the residual pressure from the oil passage 11 is applied to the drain ports 2a, 2b of the manual valve 2 via the oil passage 15 when being discharged, this does not affect the hydraulic servo B-2 for the reverse brake as the oil pressure in the oil passage 15 is maintained at the set pressure of the check valve 12.

Even in a situation where the vehicle is started again in a short time after the engine is stopped by idling stop, the oil passages 9a, 9b, 9c on the discharge side of the electromagnetic pump 3 are maintained at the predetermined pressure by the orifice group 13 and the check valve 12 as described above, and the discharge pressure of the electromagnetic pump rises quickly. Even in the state before the discharge pump pressure rises, the oil pressure of the mechanical pump according to starting of the engine rises quickly from the predetermined pressure, so that the C1 clutch is smoothly engaged and the vehicle is started without causing discomfort.

In a failed state where the switching valve 5 cannot be switched from the second state (the left half position), the D range line pressure $P_D$ is directed to the third input port 5f via the check valve 10 and is supplied to the hydraulic servo C-1 for the C1 clutch via the output port 5c, so that the vehicle can be started.

In the state where the manual valve 2 is operated to the reverse (R) range, the R range line pressure port 2r communicates with the line pressure port 21, and the line pressure is supplied to the hydraulic servo B-2 for the reverse brake via the R range line pressure port 2r. When the manual valve 2 is operated from the R range to other range, e.g., the N or D range, the R range line pressure port 2r communicates with the drain ports 2a, 2b, and the oil pressure of the hydraulic servo B-2 is discharged from the check valve 12 via the ports 2r, 2a, 2b and the oil passage 15. The oil pressure of the hydraulic servo B-2 is thus maintained at the set pressure of the check valve 12, so that the oil pressure can be smoothly and quickly supplied to the hydraulic servo B-2 and entry of air into the hydraulic servo B-2 can be prevented.

As described above, according to the hydraulic device 1 of the present embodiment, in the first state where the oil pressure based on the mechanical pump is supplied to the hydraulic servo C-1 for the C1 clutch, the oil passage 11 from the electromagnetic pump 3 including the second input port 5b is maintained at the predetermined pressure higher than the set pressure of the check valve 12 as the orifices 13 are provided in the oil passage 11. The oil pressure of the hydraulic servo C-1 for the C1 clutch therefore quickly and smoothly rises toward an engagement pressure when the vehicle is started again after idling stop. The vehicle can thus be quickly started without causing discomfort. Moreover, since the orifices 13 are provided, a check valve with common design having a low set opening pressure can be used as the check valve 12. Reduction in cost can thus be achieved by using parts with common design (modularized parts).

Since a check valve with common design can be used as the check valve 12, the check valve 12 can also be used for, e.g., the oil passage 15 of the hydraulic servo B-2 for the reverse brake etc. In this case, the check valve 12 communicates with other oil passage to which the oil pressure is drained in the D range, and does not interfere with the function of the check valve 12 in the D range. Entry of air into this other oil passage 15, etc. can thus be prevented.

In the hydraulic device 1 of the present embodiment, the orifices 13 are a orifice group as the plurality of orifices 13a to 13d arranged in series to communicate with each other. The hole diameter of a single orifice is limited in terms of processing or reliability. Accordingly, if a single orifice is used, it is difficult to set the predetermined pressure so as to ensure a sufficient pressure drop. However, since the plurality of orifices arranged in series to communicate with each other is used as the orifice group, the predetermined pressure can be ensured in the second input port 5b by using the orifices with common design.

In the hydraulic device 1 of the present embodiment, the switching valve 5 has the drain port 5e that communicates with the electromagnetic pump 3 and the check valve 12 when in the first state, and the third input port 5f that is closed when in the first state. In the first state, an oil pressure leaks from the first input port 5a and from the third input port 5f in a closed state into the second input port 5b in a closed state, so that the oil passages 9a, 9b located upstream of the orifices 13 are maintained at the predetermined pressure.

According to the hydraulic device 1 of the present embodiment, the switching valve 5 has the third input port 5f to which the oil pressure based on the line pressure is supplied in case of a failure etc. Even if the electromagnetic pump 3 is not driven due to leakage of the oil pressure from the third input port 5f into the second input port 5b of the switching valve 5, the predetermined pressure can be secured in the oil passages 9a, 9b from the electromagnetic pump 3 by the orifices 13 and the check valve 12.

In the hydraulic device 1 of the present embodiment, an oil pressure is supplied to the hydraulic servo C-1 for the C1 clutch when in the drive range, and an oil pressure is supplied to the hydraulic servo B-2 for the reverse brake when in the reverse range. When in the reverse range, an oil pressure is thus supplied to the hydraulic servo B-2 for the reverse brake having the drain oil passage 15 communicating between the orifices 13 and the check valve 12. The hydraulic servo B-2 for the reverse brake is therefore maintained at the set pressure of the check valve 12 when in the D range. Accordingly, even if the oil pressure from the electromagnetic pump 3 is applied to the check valve 12 when the engine is started again after idling stop, this does not affect operation of the hydraulic servo B-2 for the reverse brake.

The hydraulic device 1 of the present embodiment includes the manual valve 2 that has the R range line pressure port 2r, the drain ports 2a, 2b, and the line pressure port 21, that allows the R range line pressure port 2r to communicate with the line pressure port 21 when in the reverse range, and that allows the R range line pressure port 2r to communicate with the drain ports 2a, 2b when in the ranges other than the reverse range. The R range line pressure port 2r of the manual valve 2 communicates with the hydraulic servo B-2 for the reverse brake, and the drain ports 2a, 2b of the manual valve 2 communicate between the orifices 13 and the check valve 12 via the oil passage 15 of the hydraulic servo B-2 for the reverse brake. Accordingly, in the reverse range, a reverse range pressure switched by the manual valve 2 can be supplied to the hydraulic servo B-2 for the reverse brake, and in the ranges other than the reverse range, the oil pressure from the hydraulic servo B-2 for the reverse brake can be drained via the manual valve 2.

In the hydraulic device 1 of the present embodiment, the oil pressure in the oil passage 15 of the hydraulic servo B-2 for the reverse brake in the ranges other than the reverse range is the set pressure of the check valve 12. Accordingly, even if the residual pressure from the oil passage 11 is applied to the drain ports 2a, 2b of the manual valve 2 via the oil passage 15, this does not affect the hydraulic servo B-2 for the reverse brake as the oil pressure in the oil passage 15 is maintained at the set pressure of the check valve 12.

The switching valve 5 described above receives the discharge pressure of the electromagnetic pump 3 from the second input port 5b and the communication port 5d via the branched oil passages. However, the switching valve 5 may receive the discharge pressure of the electromagnetic pump 3 via a single oil passage, as shown in FIG. 7 of Japanese Patent Application Publication No. 2012-122560. The single switching valve 5 is used to switch supply of an oil pressure to the hydraulic servo C-1 for the C1 clutch and to discharge an oil pressure to the check valve 12. However, a separate valve may be used to discharge the oil pressure to the check valve 12, as shown in FIG. 8 of Japanese Patent Application Publication No. 2012-122560. A motor-driven pump that is driven by an electric motor may be used instead of the electromagnetic pump 3. The check valve 12 may be other discharge valves such as a check ball instead of the check valve. In this case, the set pressure of the discharge valve may be an oil pressure as low as substantially 0 etc. The oil passage 15 that communicates with the check valve 12 is not limited to the oil passage of the hydraulic servo B-2 for the B2 brake to which an oil pressure is supplied when in the R range, but may be other oil passages of other hydraulic servos etc. to which an oil pressure is drained when in the D range.

INDUSTRIAL APPLICABILITY

The hydraulic device of the present disclosure is applicable to hydraulic devices having a discharge valve, and is preferably applied particularly to hydraulic devices for vehicles that are moved by an engine.

The invention claimed is:

1. A hydraulic device comprising:
a mechanical pump that is driven by power from an engine,
an electric pump that is driven by electric power,
a first hydraulic servo for a first friction engagement element that is engaged when a vehicle is started,
a second hydraulic servo for a second friction engagement element which is provided separately from the first hydraulic servo,
a pressure regulation valve that regulates an oil pressure based on the mechanical pump,
a switching valve that switches between a first state where a first input port communicating with the pressure regulation valve communicates with an output port communicating with the first hydraulic servo by the oil pressure based on the mechanical pump, and a second state where the mechanical pump is stopped and a second input port communicating with the electric pump communicates with the output port accordingly, and
a discharge valve that communicates with an oil passage from the electric pump and discharges an oil pressure equal to or higher than a set pressure when the switching valve is in the first state, wherein
an orifice is provided upstream of the discharge valve in an oil passage from the electric pump,
a drain oil passage from the second hydraulic servo communicates between the orifice and the discharge valve in the oil passage from the electric pump, and
an oil pressure in the oil passage upstream of the orifice is maintained at a predetermined pressure higher than the set pressure.

2. The hydraulic device according to claim 1, wherein the orifice is an orifice group as a plurality of orifices arranged in series to communicate with each other.

3. The hydraulic device according to claim 2, wherein the switching valve has a drain port that communicates with the electric pump and the discharge valve when in the first state and a third input port that is closed when in the first state, and in the first state, an oil pressure leaks from the first input port and from the third input port in the closed state into the second input port in the closed state, so that the oil passage upstream of the orifice is maintained at the predetermined pressure.

4. The hydraulic device according to claim 3, wherein an oil pressure is supplied to the first hydraulic servo when in a drive range, and
an oil pressure is supplied to the second hydraulic servo when in a reverse range.

5. The hydraulic device according to claim 4, further comprising:
a manual valve that has a reverse range port, a drain port, and a source pressure port, that allows the reverse range port to communicate with the source pressure port when in the reverse range, and that allows the reverse range port to communicate with the drain port when in a range other than the reverse range,
the reverse range port of the manual valve communicates with the second hydraulic servo, and
the drain port of the manual valve communicates between the orifice and the discharge valve via the drain oil passage of the second hydraulic servo.

6. The hydraulic device according to claim 5, wherein
an oil pressure in the drain oil passage of the second hydraulic servo in the range other than the reverse range is the set pressure of the discharge valve.

7. The hydraulic device according to claim 1, wherein
the switching valve has a drain port that communicates with the electric pump and the discharge valve when in the first state and a third input port that is closed when in the first state, and in the first state, an oil pressure leaks from the first input port and from the third input port in the closed state into the second input port in the closed state, so that the oil passage upstream of the orifice is maintained at the predetermined pressure.

8. The hydraulic device according to claim 1, wherein
an oil pressure is supplied to the first hydraulic servo when in a drive range, and
an oil pressure is supplied to the second hydraulic servo when in a reverse range.

9. The hydraulic device according to claim 8, further comprising:
a manual valve that has a reverse range port, a drain port, and a source pressure port, that allows the reverse range port to communicate with the source pressure port when in the reverse range, and that allows the reverse range port to communicate with the drain port when in a range other than the reverse range,
the reverse range port of the manual valve communicates with the second hydraulic servo, and
the drain port of the manual valve communicates between the orifice and the discharge valve via the drain oil passage of the second hydraulic servo.

10. The hydraulic device according to claim 8, wherein
an oil pressure in the drain oil passage of the second hydraulic servo in the range other than the reverse range is the set pressure of the discharge valve.

* * * * *